(12) United States Patent
Ghosh

(10) Patent No.: US 9,639,573 B2
(45) Date of Patent: May 2, 2017

(54) SYSTEMS AND METHODS FOR QUERY QUEUE OPTIMIZATION

(71) Applicant: MasterCard International Incorporated, New York, NY (US)

(72) Inventor: Debashis Ghosh, Charlotte, NC (US)

(73) Assignee: MasterCard International Incorporated, Purchase, NY (US)

(\*) Notice: Subject to any disclaimer, the term of this patent is extended or adjusted under 35 U.S.C. 154(b) by 254 days.

(21) Appl. No.: 13/947,870

(22) Filed: Jul. 22, 2013

(65) Prior Publication Data

US 2015/0026692 A1 Jan. 22, 2015

(51) Int. Cl.
*G06F 17/30* (2006.01)

(52) U.S. Cl.
CPC .............. *G06F 17/30424* (2013.01)

(58) Field of Classification Search
CPC .................................................... G06F 9/4881
USPC ........................................................ 718/103
See application file for complete search history.

(56) References Cited

U.S. PATENT DOCUMENTS

| | | | |
|---|---|---|---|
| 7,051,330 B1 | 5/2006 | Kaler et al. | |
| 7,308,437 B2 | 12/2007 | Day et al. | |
| 7,680,784 B2 | 3/2010 | Furuya et al. | |
| 7,739,268 B2 | 6/2010 | Cunningham et al. | |
| 7,966,311 B2 | 6/2011 | Haase | |
| 8,280,874 B2 | 10/2012 | Weissman et al. | |
| 8,280,875 B2 | 10/2012 | Weissman et al. | |
| 8,516,488 B1* | 8/2013 | Brown | G06F 17/30463 707/718 |
| 8,595,262 B1* | 11/2013 | Hayden | G06F 17/30545 370/252 |
| 2003/0158842 A1 | 8/2003 | Levy et al. | |
| 2004/0073549 A1 | 4/2004 | Turkel et al. | |
| 2005/0021511 A1* | 1/2005 | Zarom | 707/3 |
| 2009/0299998 A1* | 12/2009 | Kim | G06F 17/30864 |
| 2010/0095299 A1* | 4/2010 | Gupta | G06F 9/4881 718/103 |
| 2010/0106638 A1 | 4/2010 | Allison et al. | |
| 2011/0099191 A1 | 4/2011 | Ghosh et al. | |
| 2011/0154017 A1 | 6/2011 | Edstrom et al. | |
| 2012/0136850 A1* | 5/2012 | Barsness | G06F 17/30471 707/720 |
| 2012/0215764 A1* | 8/2012 | Barsness et al. | 707/720 |
| 2013/0024442 A1* | 1/2013 | Santosuosso et al. | 707/720 |
| 2014/0114952 A1* | 4/2014 | Robinson | G06F 17/30445 707/718 |
| 2014/0149392 A1* | 5/2014 | Wang | G06F 17/30011 707/722 |

(Continued)

*Primary Examiner* — Charlie Sun
(74) *Attorney, Agent, or Firm* — Armstrong Teasdale LLP

(57) ABSTRACT

A computer-implemented method for optimizing a queue of queries for database efficiency is implemented by a controller computing device coupled to a memory device. The method includes receiving a plurality of database queries at the computing device from at least one host, evaluating the plurality of database queries to determine a resource impact associated with each database query of the plurality of database queries, prioritizing the plurality of database queries based upon a set of prioritization factors and the resource impact associated with each database query, and submitting the prioritized plurality of database queries to a database system for execution. The database system executes the plurality of database queries in order of priority.

25 Claims, 7 Drawing Sheets

(56) References Cited

U.S. PATENT DOCUMENTS

2014/0372331 A1* 12/2014 Willis .................... G06Q 50/01
705/320

* cited by examiner

SYSTEMS AND METHODS FOR QUERY QUEUE OPTIMIZATION

BACKGROUND OF THE DISCLOSURE

The field of the disclosure relates generally to queues of database queries, and more particularly, to systems and methods for optimizing queues of database queries for greater efficiency.

Known database systems utilize a variety of overall computer system resources to execute database queries. System resources utilized by database systems in query execution include, for example, CPU time, memory, data storage, and network resources. The utilization of such computer system resources also impacts financial, logistical, and human resources related to database system resources. In some known database systems, multiple queries may simultaneously be submitted to the database system for execution. Each of the multiple queries may have varying resource impact and varying significance to the business purposes related to the database system. It may be preferable to execute some of the multiple queries before other queries. However, known systems are not able to determine a preferred order in which to execute the queries.

Database queries, upon execution, are designed to produce an output of information often known as a result set. Database queries may be written by users in a variety of ways to achieve a similar or identical result set. Some database queries may consume greater resources than other database queries yet achieve a similar or identical result set.

BRIEF DESCRIPTION OF THE DISCLOSURE

In one aspect, a computer-implemented method for optimizing a queue of queries for database efficiency is provided. The method is implemented by a controller computing device coupled to a memory device. The method includes receiving a plurality of database queries at the controller computing device from at least one host, evaluating the plurality of database queries to determine a resource impact associated with each database query of the plurality of database queries, prioritizing the plurality of database queries based upon a set of prioritization factors and the resource impact associated with each database query, and submitting the prioritized plurality of database queries to a database system for execution. The database system executes the plurality of database queries in order of priority.

In another aspect, a computer system for optimizing a queue of queries for database efficiency is provided. The computer system includes a processor and a memory device coupled to the processor. The computer system is configured to receive a plurality of database queries from at least one host, evaluate the plurality of database queries to determine a resource impact associated with each database query of the plurality of database queries, prioritize the plurality of database queries based upon a set of prioritization factors and the resource impact associated with each database query, and submit the prioritized plurality of database queries to a database system for execution. The database system executes the plurality of database queries in order of priority.

In a further aspect, computer-readable storage media for optimizing a queue of queries for database efficiency is provided. The computer-readable storage media has computer-executable instructions embodied thereon. When executed by at least one processor, the computer-executable instructions cause the processor to evaluate a plurality of database queries to determine a resource impact associated with each database query of the plurality of database queries, prioritize the plurality of database queries based upon a set of prioritization factors and the resource impact associated with each database query, and submit the prioritized plurality of database queries to a database system for execution. The database system executes the plurality of database queries in order of priority.

BRIEF DESCRIPTION OF THE DRAWINGS

The figures listed below show example embodiments of the methods and systems described herein.

Figure 1:
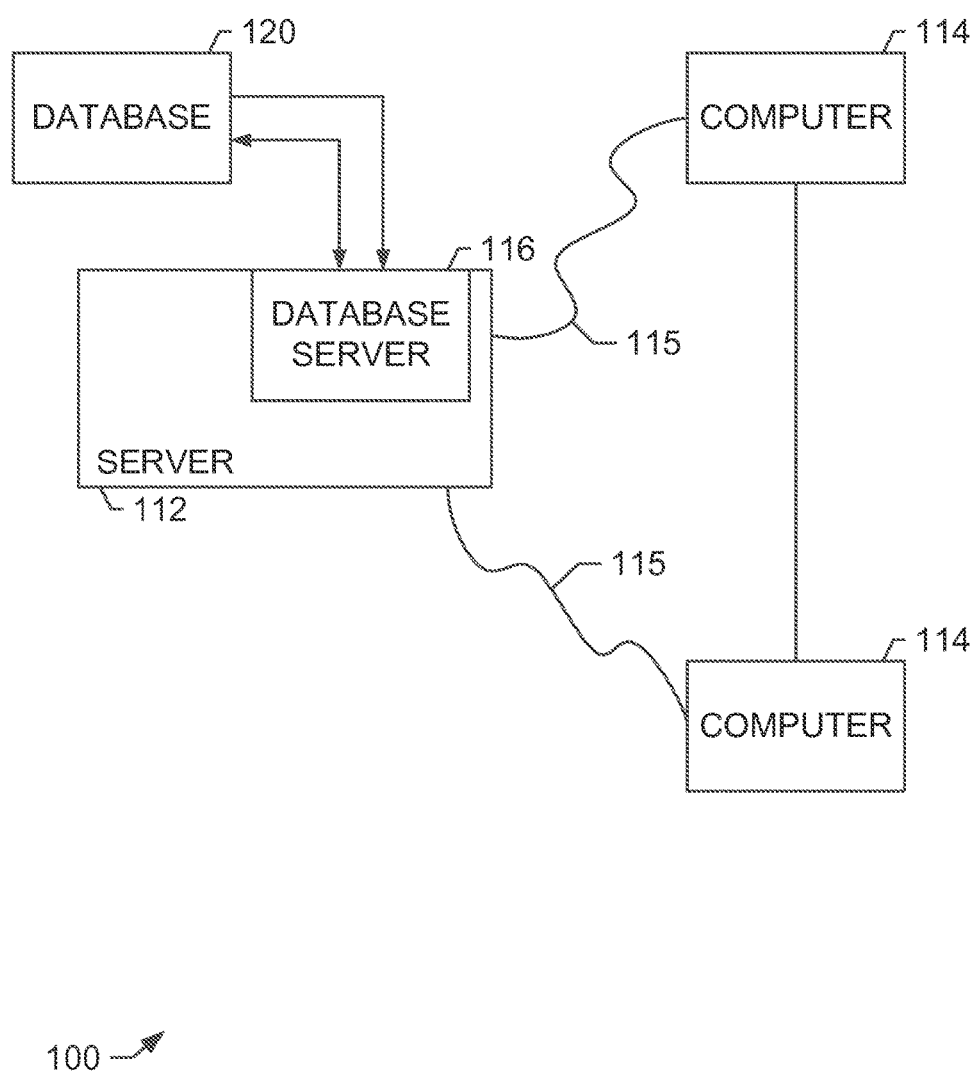
FIG. 1 is a simplified block diagram of an example embodiment of a system for optimizing a queue of queries for database efficiency in accordance with one embodiment of the present disclosure.

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

The following detailed description of the embodiments of the disclosure refers to the accompanying drawings. The same reference numbers in different drawings may identify the same or similar elements. Also, the following detailed description does not limit the claims.

This subject matter described herein relates generally to optimizing a queue of queries for database efficiency. Database queries are received by a plurality of hosts, evaluated, prioritized, and submitted for execution. Specifically, the methods and systems described herein include receiving a plurality of database queries, evaluating the plurality of database queries to determine a resource impact, prioritizing the plurality of database queries based upon a set of prioritization factors and the resource impact, and submitting the prioritized plurality of database queries to a database system for execution.

In the example database system, multiple database queries may be received for processing simultaneously or near simultaneously. These multiple database queries may also be called a "queue of queries" as each database query is sorted in a preferred order of execution. The multiple database queries may be executed in any order. However, the system described herein executes the queue of queries in a preferred order to increase the efficiency of operation of the database system.

Each database query may have a specific priority and a specific resource impact if executed. In a simple example, three database queries may be submitted simultaneously. For example, a first database analyst DBA1 may create and submit Query1 while a second database analyst DBA2 may create and submit Query2 and a third database analyst DBA3 may create and submit Query3. Query1 may be a relatively simple query which can process with minimal impact to database system resources. Query1 may also have a major importance to the business goals of the enterprise running the database system. Query2 may be a moderately complex query with moderate impact to database system resources. Query2 may have a moderate importance to the business goals of the enterprise running the database system. Query3 may be a significantly complex query with major impact to database system resources. Query3 may have a minor importance to the business goals of the enterprise running the database system. Accordingly, it may be desirable to prioritize the database queries in an order beginning with Query1 followed by Query2 followed by Query3 so as to most efficiently meet the business goals of the enterprise and minimize the resource impact on the database system. Alternative orders of the database queries may result in a misallocation of resources. In more complex scenarios, many additional factors may impact the methods of prioritizing including the age of the data, the quality of the data, whether multiple queries require the same resources, whether queries are substantially or entirely redundant, and the organization to which each database analyst belongs. The methods and systems described herein facilitate evaluation and prioritization to allow a database system to optimize the queue.

In the example embodiment, a plurality of database queries is received at a controller computing device. The database queries may be generated by a user including, for example, a database analyst, a business analyst, or a database administrator. Each database query is initially written at a host. The controller computing device may receive the plurality of database queries from one host or a plurality of hosts. The controller computing device initially assigns a unique identifier to each database query. The unique identifier is used, as discussed further below, to facilitate the optimization of the queue of queries. The controller computing device also may record each database query to facilitate the optimization of the queue of queries. Each database query may be written to the memory device of the controller computing device as a cached query. Each database query may also be written as an archived query to a storage device associated with the controller computing device.

The controller computing device evaluates the plurality of database queries to determine a resource impact associated with each database query. The resource impact represents an impact to the database system associated with executing each database query. The controller computing device is in communication with the database system. The resource impact may be a single value or an array of values. The resource impact may refer to technical impacts to the database system including CPU utilization, memory utilization, and storage utilization. The resource impact may also refer to financial or logistical impacts. The resource impact may therefore include, without limitation, an estimated query runtime associated with each database query, an estimated query memory consumption associated with each database query, an estimated financial cost associated with each database query, a schedule impact associated with each database query, a human resource impact associated with each database query, and an estimated query storage utilization associated with each database query. In some cases, a resource impact may be a numeric value. For example, a resource impact for a particular database query may include a CPU utilization of 0.25 seconds. In other cases, a resource impact may include a ranked value. For example, a resource impact for a particular database query may include a ranking based on CPU utilization where the database query has the third highest CPU utilization in a queue of twenty database queries.

The controller computing device additionally evaluates the plurality of database queries to determine whether any database query is completely redundant with another database query. If a particular query (e.g., Query4) is completely redundant with another query (e.g., Query5), the computing device will only execute one query (e.g., Query4) and provide the result set associated with the executed query to the hosts submitting both Query4 and Query5. As a result, the database system only processes one database query yet provides output for two database queries.

After each database query is evaluated to determine a resource impact for each database query, the controller computing device prioritizes the plurality of database queries using a set of prioritization factors along with previously determined resource impacts. Prioritization factors may include any factors which may be useful to determine how to prioritize the queue of database queries. Prioritization factors may include, without limitation, total resource impact, ranking of a host submitting each database query, ranking of an analyst generating each database query, data source quality, and system administrator input. Data source quality may represent the relative quality of data in a data source queried by a particular database query.

If a particular database query is evaluated by the controller computing device to have a query runtime that exceeds a query runtime threshold, the controller computing device will determine the database query to be an inefficient query. The query runtime threshold represents the maximum acceptable runtime for a query creating a result set substantially similar to the intended result set of the inefficient query. The query runtime threshold may be set by a user, a programmatic efficiency metric, and/or system defaults. Inefficient queries and redundant queries are determined to be expensive queries during the prioritization of the plurality of database queries. Expensive queries are removed from the queue of queries.

If the controller computing device determines that the queue of queries includes an inefficient query, the controller computing device will identify at least one data analyst designated as a submitter of the removed inefficient query. The controller computing device will identify a subject matter expert associated with the data analyst and send a message to the subject matter expert indicating that the data analyst may require additional training.

In some cases, at least some database queries in the queue of queries may be run on database systems with distinct functional characteristics. For instance, some database systems may allow for simultaneous processing of queries while others may not. The computing device will prioritize the queue of queries according to the functional characteristics of the database systems.

Once the queue of queries has been prioritized, the controller computing device submits the prioritized plurality of database queries to one of a plurality of database systems for execution. The database system executes the plurality of database queries in order of priority. If redundant queries were identified and removed from the queue of queries, the controller computing device will receive the query output associated with the submitted prioritized plurality of database queries and associate each query output of the plurality of query output with at least one unique identifier. As a result, the previously removed redundant queries can receive a result set associated with the remaining executed query.

Described in detail herein are example embodiments of systems and methods for optimizing a queue of queries for database efficiency. The systems and methods facilitate, for example, receiving a plurality of database queries from at least one host, evaluating the plurality of database queries to determine a resource impact associated with each database query of the plurality of database queries, prioritizing the plurality of database queries based upon a set of prioritization factors and the resource impact associated with each database query, and submitting the prioritized plurality of database queries to a database system for execution. A technical effect of the systems and methods described herein include at least one of (a) reducing the incidence of redundant queries from processing in a database system; (b) managing the utilization of database system resources effectively; (c) factoring financial considerations into database management and utilization; and (d) reducing the time to receive mission-critical data analysis.

More specifically, the technical effects can be achieved by performing at least one of the following steps: (a) receiving a plurality of database queries from at least one host; (b) evaluating the plurality of database queries to determine a resource impact associated with each database query of the plurality of database queries; (c) prioritizing the plurality of database queries based upon a set of prioritization factors and the resource impact associated with each database query; (d) submitting the prioritized plurality of database queries to a database system for execution; (e) writing the plurality of database queries in at least one of the memory device as cached queries and a storage device as archived queries; (f) assigning a unique identifier to each database query from the plurality of database queries; (g) receiving a plurality of query output associated with the submitted prioritized plurality of database queries; (h) associating each query output of the plurality of query output with at least one unique identifier; (i) determining at least one of an estimated query runtime associated with each database query, an estimated query memory consumption associated with each database query, an estimated financial cost associated with each database query, a schedule impact associated with each database query, a human resource impact associated with each database query, and an estimated query storage utilization associated with each database query; (j) evaluating the plurality of database queries to determine whether a first query is completely redundant with a second query; (k) removing expensive queries wherein expensive queries are at least one of an inefficient query and a redundant query; (l) identifying removed inefficient queries, identifying, from each removed inefficient queries, at least one data analyst designated as a submitter of the removed inefficient queries, identifying a subject matter expert associated with each data analyst, and sending a message to the subject matter expert indicating that the data analyst may require additional training; (m) prioritizing the plurality of database queries based upon at least one of resource impact, ranking of a host submitting each database query, ranking of an analyst generating each database query, data source quality, and system administrator input, (n) creating a relative resource impact wherein the relative resource impact is an assigned rank for each query of the plurality of database queries, (o) determining functional characteristics of a database system associated with the plurality of database queries and prioritizing the database queries according to the functional characteristics of the database system.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, or to a relational database management system (RDBMS), or both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL®, IBM® DB2, Microsoft® SQL Server, Sybase®, and PostgreSQL. However, any database may be used that enables the systems and methods described herein. (Oracle and MySQL are registered trademarks of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.) As used herein, the term "database system" refers specifically to a RDBMS.

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to managing computing infrastructures.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a simplified block diagram of an example system 100 for optimizing a queue of queries for database efficiency, including a plurality of computer devices in accordance with one embodiment of the present disclosure. More specifically, in the example embodiment, system 100 includes a controller computing device 112 and a plurality of client sub-systems, also referred to as "hosts" 114, connected to controller computing device 112. In one embodiment, controller computing device 112 may be a computing server configured to perform the operations herein and may be referred to as a controller server. In one embodiment, hosts 114 are computing devices communicatively coupled to controller computing device 112 through a network 115, such an such as a local area network (LAN) or a wide area network (WAN), dial-in-connections, cable modems, and special high-speed Integrated Services Digital Network (ISDN) lines, or the Internet. In the example embodiment, hosts 114 may be associated with particular business processes. Hosts 114 may therefore generate distinct database queries which are transferred to controller computing device 112 via network 115 and prioritized, as discussed below, before being executed on database server 116.

In the example embodiment, controller computing device 112 includes a database server 116 connected to database 120, which contains data stored in data sources which may be queried by the database queries generated by hosts 114. In one embodiment, centralized database 120 is stored on controller computing device 112 and can be accessed by potential users at one of hosts 114 by logging onto controller computing device 112 through one of hosts 114. In an alternative embodiment, database 120 is stored remotely from controller computing device 112.

Database 120 may include a single database having separated sections or partitions or may include multiple databases, each being separate from each other. Each of the multiple databases may have similar or distinct functional characteristics. Database 120 may store any data in data sources which may be queried by the queue of queries described herein.

Figure 2:
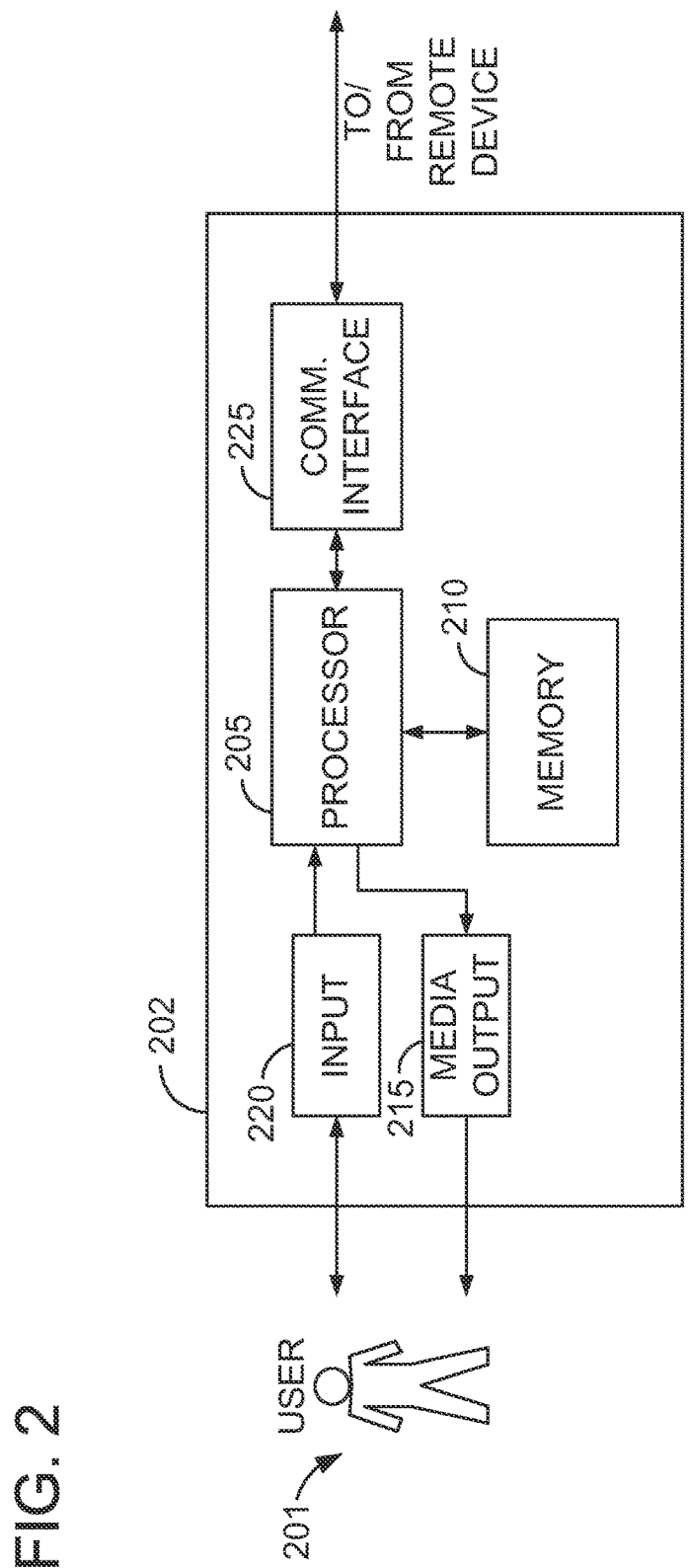
FIG. 2 illustrates an example configuration of a client system shown in FIG. 1.

FIG. 2 illustrates an example configuration of a user system 202 operated by a user 201, such as a system administrator. User system 202 may include, but is not limited to, hosts 114. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as controller computing device 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from controller computing device 112. A client application allows user 201 to interact with a server application from controller computing device 112.

Figure 3:
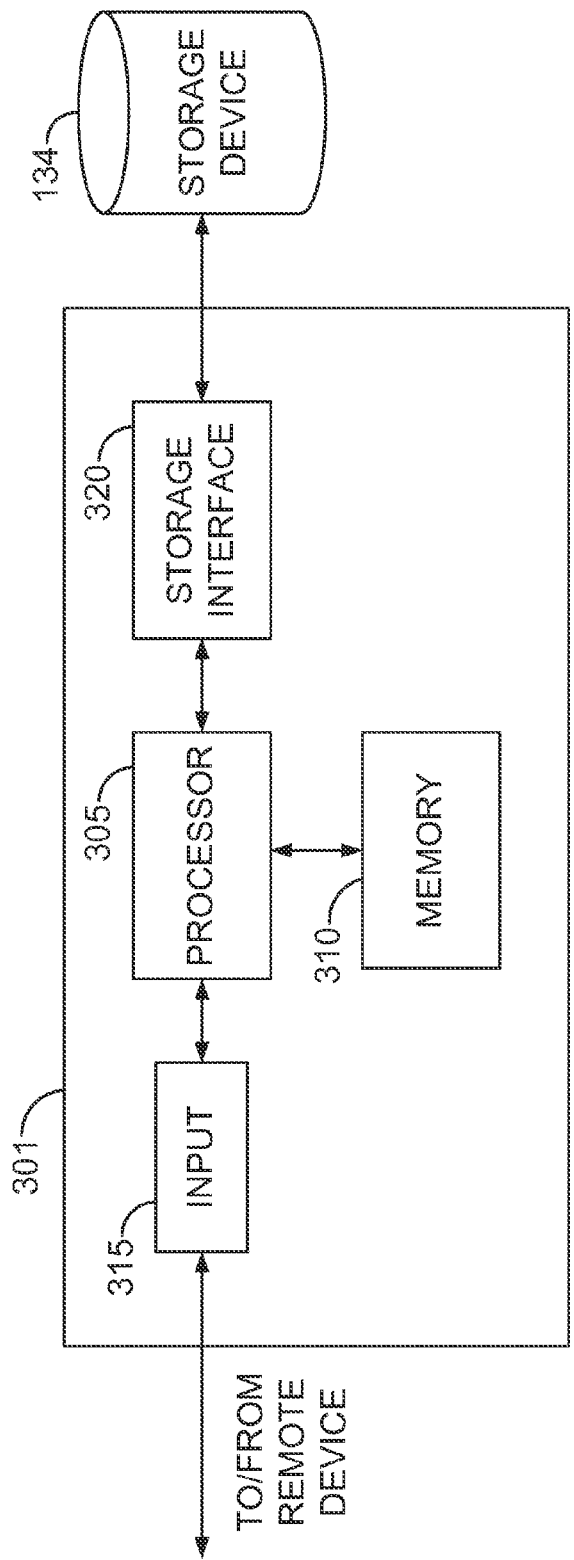
FIG. 3 illustrates an example configuration of a server system shown in FIG. 1.

FIG. 3 illustrates an example configuration of a server system 301 such as controller computing device 112 (shown in FIGS. 1 and 2). Server system 301 may include, but is not limited to, database server 116, a transaction server, a web server, a fax server, a directory server, and a mail server.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX®, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from hosts 114 via the Internet, as illustrated in FIGS. 1 and 2.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 4:
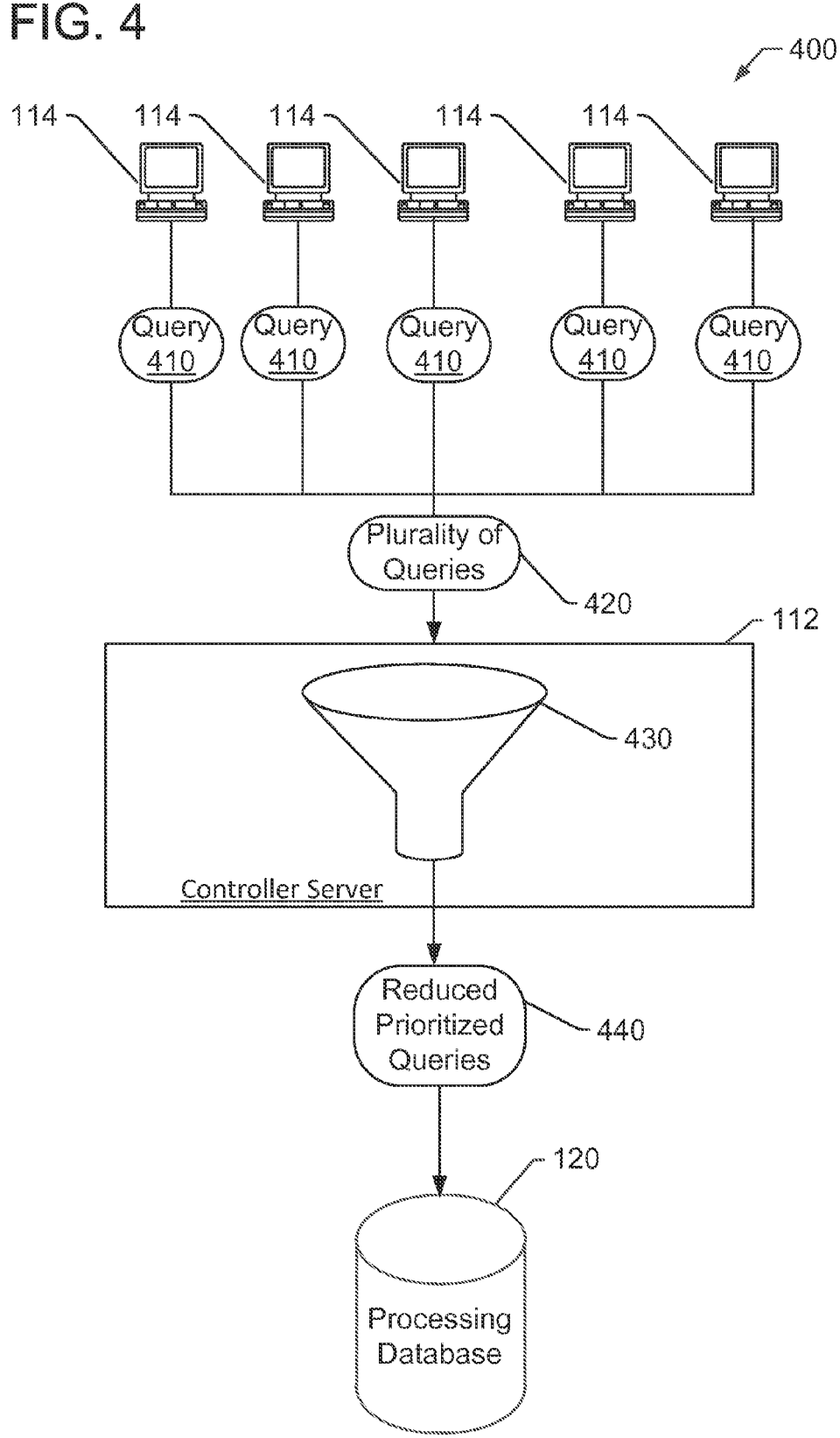
FIG. 4 is a simplified flowchart illustrating the optimization of a queue of queries for database efficiency using the system shown in FIG. 1.

FIG. 4 is a simplified flowchart illustrating the optimization of a queue of queries for database efficiency using controller computing device 112 (shown in FIG. 1). In flowchart 400, each host 114 submits a database query 410. Each host 114 may be associated with a distinct user and a distinct business function. As described above, each database query 410 may be associated with a distinct resource impact. Resource impacts may refer to, without limitation, technical impacts to the database system, financial impacts, or logistical impacts. The resource impact may include, without limitation, an estimated query runtime associated with each database query 410, an estimated query memory consumption associated with each database query 410, an estimated financial cost associated with each database query 410, a schedule impact associated with each database query 410, a human resource impact associated with each database query 410, and an estimated query storage utilization associated with each database query 410.

In flowchart 400, five hosts 114 generate five database queries 410. For example, assume that the five database queries 410, as read from left to right, have resource impact for query runtime, as follows (Table 1):

TABLE 1

| Query Name | QueryA | QueryB | QueryC | QueryD | QueryE |
|---|---|---|---|---|---|
| Query Runtime (seconds) | 0.1 | 1.0 | 10 | 100 | 1000 |

In this example, without further information, database queries 410 should be prioritized with QueryA executed first followed by QueryB, QueryC, QueryD, and QueryE. However, assume that the five database queries 410, as read from left to right, instead have resource impact for query runtime and storage utilization, as follows (Table 2):

TABLE 2

| Query Name | QueryA | QueryB | QueryC | QueryD | QueryE |
|---|---|---|---|---|---|
| Query Runtime (seconds) | 0.1 | 1.0 | 10 | 100 | 1000 |
| Storage Utilization (lowest to highest) | Fifth | Second | Fourth | Third | First |

Resource impact may be absolute values such as a query runtime in seconds or in relative values as in the storage utilization. Assessing the priority of database queries now requires an understanding of the significance of each resource. Further, consider that each database query 410 has a distinct business impact because the result set produced is tied to important or less important activities. For example, assume that the five database queries 410, as read from left to right, instead have resource impact for query runtime, storage utilization, and financial impact of a decision related to each database query 410, as follows (Table 3):

TABLE 3

| Query Name | QueryA | QueryB | QueryC | QueryD | QueryE |
|---|---|---|---|---|---|
| Query Runtime (seconds) | 0.1 | 1.0 | 10 | 100 | 1000 |
| Storage Utilization (lowest to highest) | Fifth | Second | Fourth | Third | First |
| Impact of Decision | $0 | $25,000 | $3.5M | $100,000 | $0 |

As the resource impact associated with a database query 410 becomes more complicated, the determination of which database queries have a relatively higher priority becomes more and more complex. Understanding the priorities of the database system may be required to properly prioritize the database queries 410.

Database queries 410 are received as a plurality of database queries 420 at controller computing device 112. Queue query optimization module 430 is executed by controller computing device 112. Queue query optimization module 430 evaluates each database query 410 including determining a resource impact associated with each database query 410. The resource impact may reflect a numeric value or a ranked value. For example, a resource impact for a particular database query 410 may include a storage utilization of 2.2 MB as a numeric value of a resource impact to storage utilization. Alternatively, a resource impact for a particular database query 410 may include a ranking of fifth of seven database queries 410 in the plurality of database queries 420 for storage utilization. Evaluating each database query 410 also includes determining whether any database queries 410 are completely redundant with one another.

Queue query optimization module 430 prioritizes each database query 410. Prioritizing each database query 410 includes determining the order in which each database query 410 should be run in order to optimize based upon resource impact and prioritization factors. Prioritization factors include, without limitation, resource impact, ranking of a host submitting each database query 410, ranking of an analyst generating each database query 410, data source quality, and system administrator input. Prioritizing also includes removing database queries 410 determined to be expensive. Expensive queries are queries which are either inefficient or redundant.

Once each database query 410 is prioritized, queue query optimization module 430 submits reduced prioritized queries 440 to processing database 120. Each database query 410 is executed in the order reflected in reduced prioritized queries 440.

Figure 5:
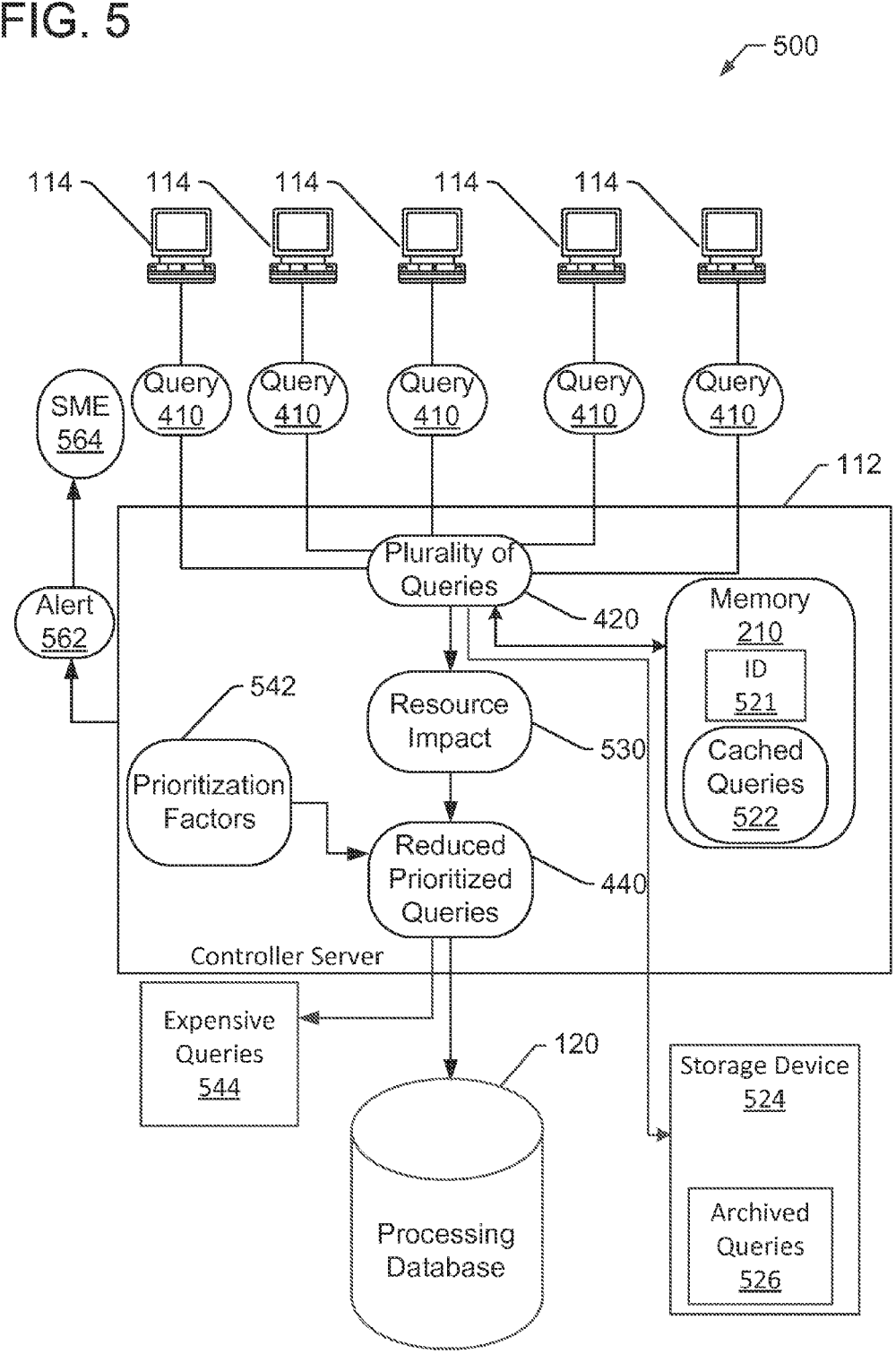
FIG. 5 is a schematic diagram illustrating an environment optimizing a queue of queries for database efficiency using the system shown in FIG. 1.

FIG. 5 is a schematic diagram illustrating an environment optimizing a queue of queries for database efficiency using controller computing device 112 (shown in FIG. 1). In diagram 500, each host 114 submits a database query 410. Each host 114 may be associated with a distinct user and a distinct business function. Database queries 410 are received at controller computing device 112 as plurality of database queries 420. Initially, each database query 410 of plurality of database queries 420 is written to memory 210 as a cached query 522. Each cached query 522 is also assigned a unique identifier 521 which is used in the prioritization and submission of plurality of database queries 420. Unique identifier 521 allows for redundant database queries to only be executed once but returned to multiple users submitting the redundant queries. Cached queries 522 are used to facilitate the prioritization of plurality of database queries 420 because caching the plurality of database queries 420 allows for the submission of database queries 410 in any order. Each database query 410 may additionally be written to a storage device 524 associated with controller computing device 112 as an archived query 526. Archived queries 526 may be used to facilitate the evaluation of subsequent database queries 410, the prioritization of subsequent database queries 410, and to record database queries 410 which may be used for training purposes.

After the plurality of database queries 420 are received at controller computing device 112, controller computing device 112 determines a resource impact 530 associated with each database query 410. The resource impact represents an impact to the database system associated with executing each database query. The resource impact may be a single value, an array of values, a relative ranking of resource impact, or any other form of data which can describe the resource impact of each database query 410. As described above, resource impact 530 may include, without limitation, an estimated query runtime associated with each database query 410, an estimated query memory consumption associated with each database query 410, an estimated financial cost associated with each database query 410, a schedule impact associated with each database query 410, a human resource impact associated with each database query 410, and an estimated query storage utilization associated with each database query 410.

In evaluating plurality of database queries 420, controller computing device 112 determines whether any database queries 410 are completely redundant with one another. A database query 410 is determined to be completely redundant with another database query 410 when both database queries 410 produce the exact same result set with the exact same query language. Redundant database queries 410 are removed from plurality of database queries 420 so that plurality of database queries 420 may be regarded as de-duplicated. In other words, if the query language of one database query 410 is repeated five times in plurality of database queries 420 (e.g., Query10, Query11, Query12, Query13, and Query14), only one database query 410 with such query language will be submitted for execution (e.g., Query10). The other database queries 410 (i.e., Query11, Query12, Query13, and Query14) will receive the result set output associated with Query10.

Controller computing device 112 next prioritizes plurality of database queries 420 using prioritization factors 542 along with resource impact 530. Prioritization factors 542 may include any factors which may be useful to determine how to prioritize the queue of database queries. Prioritization factors 542 may include, without limitation, total resource impact, ranking of a host submitting each database query, ranking of an analyst generating each database query, data source quality, and system administrator input. Prioritization factors 542 may represent a weight to assign to each resource impact 530. For example, prioritization factors 542 may indicate that query runtime is twice as significant as financial cost. Alternately, prioritization factors 542 may represent a formula applied to a variety of resource impacts 530. Additionally, prioritization factors 542 may indicate that a particular analyst or host has greater business significance than a different analyst or host. In such cases, database queries 410 generated by the more significant analyst or host may be weighed more heavily for prioritization. System administrator input may also be used to determine prioritization factors 542. Further, data source quality may be used as a prioritization factor 542 to represent the relative quality of data in a data source queried by a particular database query. In some cases, a database query 410 may have a low impact, high business significance, but be tied to stale, corrupt, or invalid data. The data source may be designated as invalid. In such cases, the database query 410 may be de-prioritized or even removed. In other cases, the database query 410 may automatically be assigned to a more current data source.

Prioritization of plurality of database queries 420 further includes removing expensive database queries 544 from consideration for execution. Three types of database queries 410 may be removed from consideration because they are determined to be expensive queries 544: inefficient queries, redundant queries, and queries executing on an invalid data source. Inefficient queries database queries 410 with a resource impact 530 indicating a query runtime that exceeds a query runtime threshold. The query runtime threshold represents the maximum acceptable runtime for a query creating a result set substantially similar to the intended result set of the inefficient query. The query runtime threshold may be set by a user, a programmatic efficiency metric, and system defaults. Redundant queries and queries executing on an invalid data source are discussed above.

If a database query 410 is determined to be inefficient and becomes an expensive query 544, controller computing device 112 will determine a user responsible for creating expensive query 544. The identity of the user responsible for creating expensive query 544 may be in metadata associated with the associated submitted database query 410, comments in query language, or identifiable based upon metadata. Controller computing device 112 will determine a subject matter expert 564 associated with the identified user using available user directory information, organizational hierarchy information, communications with the user, or any other method which may identify subject matter expert 564. Subject matter expert 564 represents an individual responsible for some portion of data analysis in the database system. Subject matter expert 564 may wish to know that a particular user created an inefficient query because it may be useful to train such a user to create more efficient queries. Controller computing device 112 sends an alert 562 to subject matter expert 564 to facilitate such training. Alert 562 may be any communication including, without limitation, a text message, an email, an automated telephone call, or any other means of communication which may facilitate communication with subject matter expert 564.

Applying prioritization factors 542 and removing expensive database queries 410 allows controller computing device 112 to produce reduced prioritized queries 440. Reduced prioritized queries 440 represents a sub-set of plurality of database queries 420 after the removal of expensive queries 544. Reduced prioritized queries 440 further represents an organization of the sub-set of plurality of database queries 420 in an order reflecting the application of prioritization factors 542 on resource impact 530. Some database systems may include a variety of processing databases 120 which may be used to process reduced prioritized queries 440. Some processing databases 120 have different functional characteristics which allow for different processing models including parallel processing of database queries 410. Accordingly, reduced prioritized queries 440 factor associated functional characteristics of processing databases 120 into prioritization.

Controller computing device 112 next submits reduced prioritized queries 440 to processing database 120 for execution. Processing database 120 executes reduced prioritized queries 440 in order of priority. If redundant queries were identified and removed from the queue of queries, controller computing device 112 will receive the query output associated with the reduced prioritized queries 440 and associate each query output of the plurality of query output with at least one unique identifier 521. As a result, the previously removed redundant queries can receive a result set associated with the remaining executed query.

Figure 6:
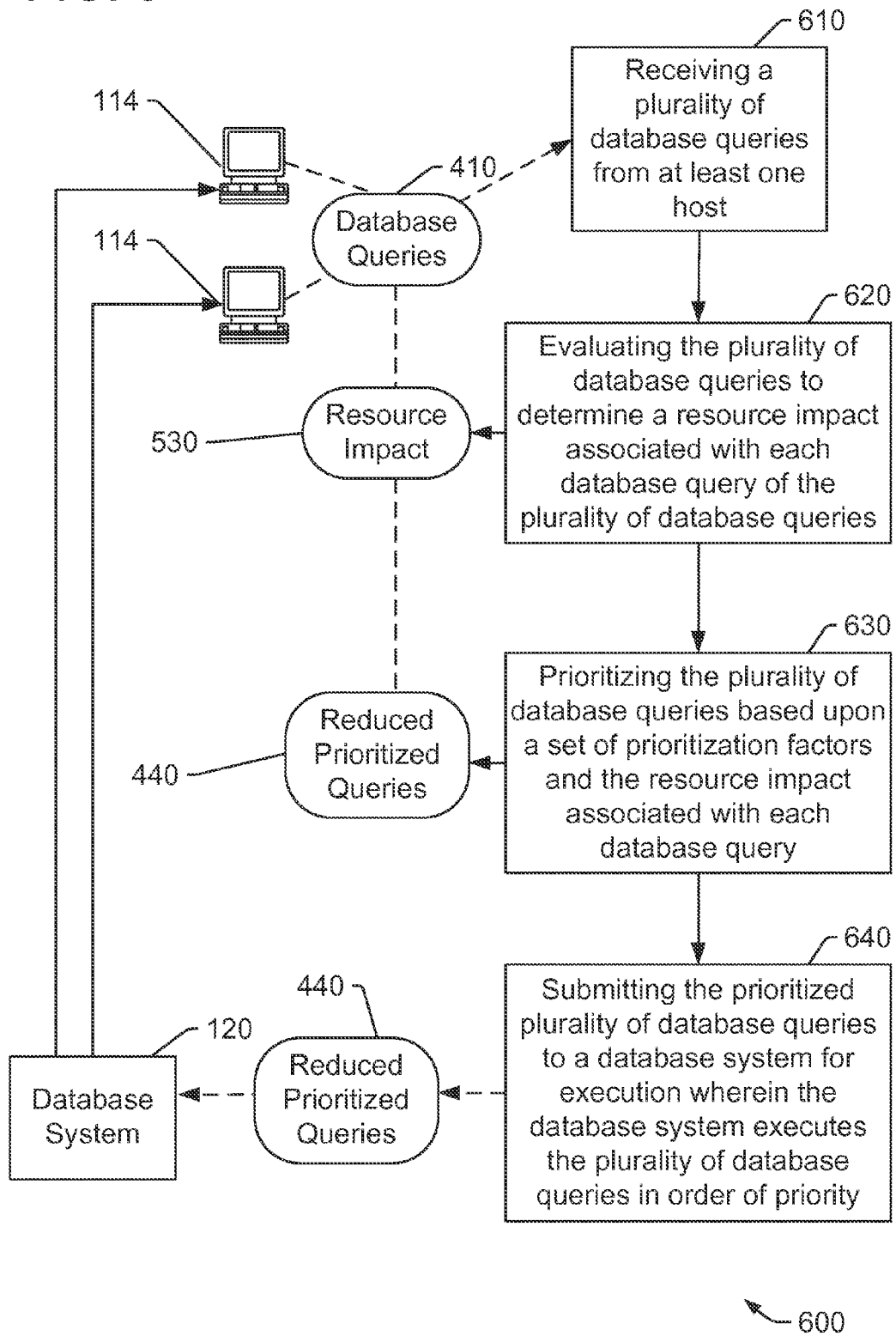
FIG. 6 is a flowchart illustrating an example process utilized by the system shown in FIG. 1 for optimizing a queue of queries for database efficiency.

FIG. 6 is a flowchart illustrating an example process 600 utilized by the system shown in FIG. 1 for optimizing a queue of queries for database efficiency. Initially, controller computing device 112 receives 610 a plurality of database queries from at least one host 114. Receiving 610 represents receiving database queries 410 from hosts 114.

Controller computing device 112 next evaluates 620 the plurality of database queries to determine a resource impact associated with each database query of the plurality of database queries. Evaluating 620 represents determining resource impact 530 for each database query 410.

Controller computing device 112 additionally prioritizes 630 the plurality of database queries based upon a set of prioritization factors and the resource impact associated with each database query. Prioritizing 630 represents creating reduced prioritized queries 440 representing received database queries 410 in an order reflective of prioritization factors 542 (shown in FIG. 5) and without expensive queries 544 (shown in FIG. 5).

Controller computing device 112 finally submits 640 the prioritized plurality of database queries to a database system for execution wherein the database system executes the plurality of database queries in order of priority.

Figure 7:
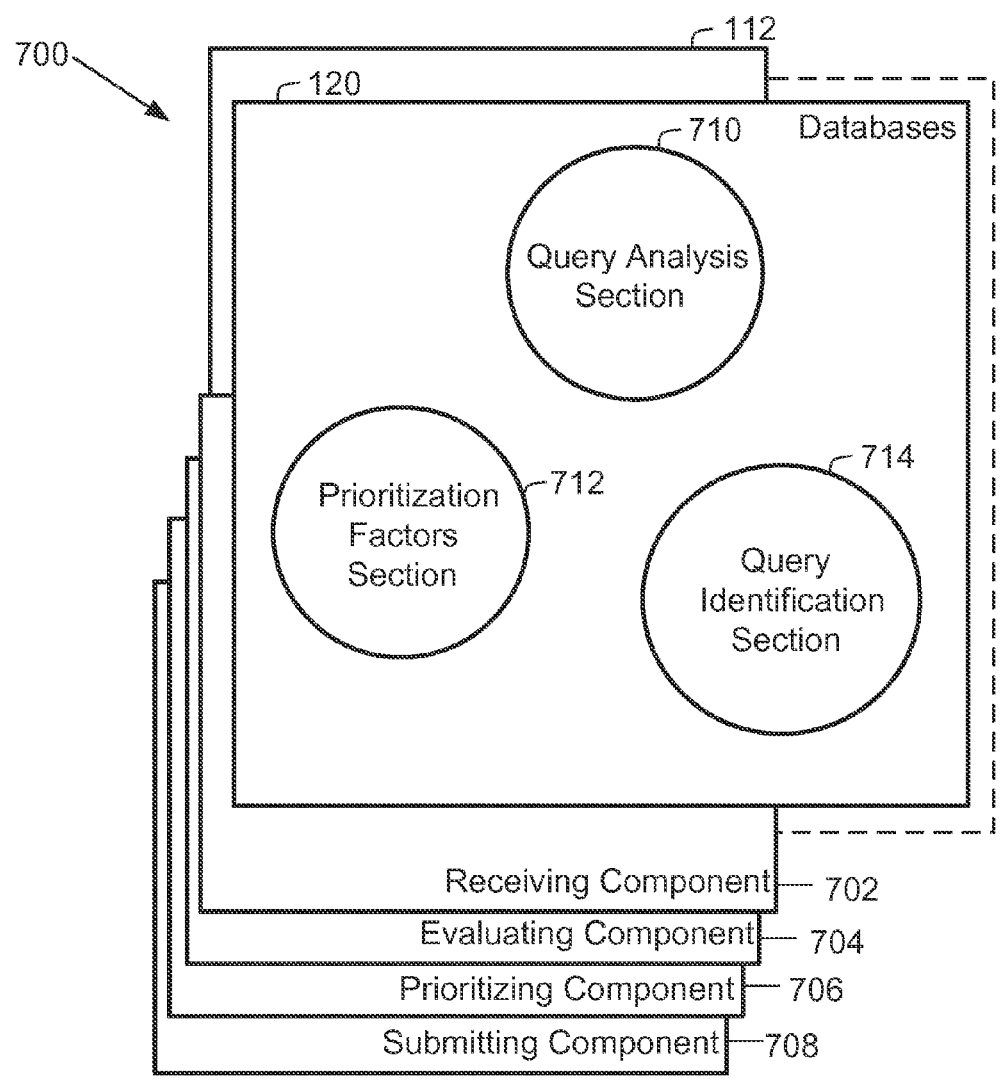
FIG. 7 is a diagram of components of one or more example computing devices that may be used in the environment shown in FIG. 5.

FIG. 7 is a diagram 700 of components of one or more example computing devices, for example controller computing device 112, which may be used in the environment shown in FIG. 5. FIG. 7 further shows a configuration of databases including at least database 120 (shown in FIG. 1). Database 120 is coupled to several separate components within controller computing device 112, which perform specific tasks.

Controller computing device 112 includes a receiving component 702 for receiving a plurality of database queries 420 (shown in FIG. 4). Controller computing device 112 also includes an evaluating component 704 for evaluating a plurality of database queries 420 to determine a resource impact 530 (shown in FIG. 5) associated with each database query 410 (shown in FIG. 4). Controller computing device 112 additionally includes a prioritizing component 706 for prioritizing the plurality of database queries 420 based upon a set of prioritization factors 542 (shown in FIG. 5) and resource impact 530 associated with each database query 410. Controller computing device 112 additionally includes a submitting component 708 for submitting the prioritized reduced prioritized queries 440 (shown in FIG. 4) to a database 120.

In an exemplary embodiment, database 120 is divided into a plurality of sections, including but not limited to, a query analysis section 710, a prioritization factors section 712, and a query identification section 714. These sections within database 120 are interconnected to update and retrieve the information as required.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for optimizing a queue of queries for database efficiency, the method implemented by a controller computing device coupled to a memory device, the method comprising:

receiving a plurality of database queries from the queue of queries, at the controller computing device, from at least one host;

evaluating the plurality of database queries to determine a resource impact associated with each database query of the plurality of database queries, wherein the resource impact is determined based on a schedule impact and a human resource impact associated with the each database query of the plurality of database queries;

prioritizing the plurality of database queries based upon a set of prioritization factors and the resource impact associated with the each database query of the plurality of database queries to optimize the plurality of database queries for greater efficiency, wherein the set of prioritization factors includes (i) a ranking of an analyst generating the each database query of the plurality of database queries, (ii) a data source quality, and (iii) a financial impact for receiving a response to the each database query of the plurality of database queries, wherein the data source quality represents a relative quality of data in a data source associated with the each database query, and wherein a higher priority factor is assigned to the each database query that has a corresponding response having a greatest financial impact;

submitting the prioritized plurality of database queries to a database system for execution; and executing, with the database system, the prioritized plurality of database queries in an order of priority produced by the prioritizing of the plurality of database queries.

2. The method of claim 1, wherein receiving the plurality of database queries further comprises writing the plurality of database queries in at least one of:
the memory device as cached database queries; and
a storage device as archived database queries.

3. The method of claim 1, further comprising:
assigning a unique identifier to the each database query from the plurality of database queries;
receiving a plurality of database query outputs associated with the submitted prioritized plurality of database queries; and
associating each database query output of the plurality of database query outputs with at least one unique identifier.

4. The method of claim 1, wherein the evaluating the plurality of database queries to determine the resource impact further comprises evaluating the plurality of database queries to determine at least one of:
an estimated query runtime associated with a database query;
an estimated query memory consumption associated with the database query;
an estimated financial cost associated with the database query; and
an estimated query storage utilization associated with the database query.

5. The method of claim 1, wherein the evaluating the plurality of database queries to determine the resource impact further comprises evaluating the plurality of database queries to determine whether a first database query from the plurality of database queries is completely redundant with a second database query from the plurality of database queries.

6. The method of claim 1, wherein the prioritizing the plurality of database queries further comprises removing expensive queries from the plurality of database queries, wherein the expensive queries are at least one of:
an inefficient database query which executes at an inefficient query runtime that exceeds a query runtime threshold set by at least one of a user, a programmatic efficiency metric, and system defaults, wherein the query runtime threshold represents the maximum acceptable runtime for a database query creating a result set substantially similar to the intended result set of the inefficient database query; and
redundant database queries which are completely redundant with at least one other database query of the plurality of database queries.

7. The method of claim 6, wherein the submitting the prioritized plurality of database queries to the database system for execution further comprises:
identifying removed inefficient database queries from the plurality of database queries;
identifying, from each removed inefficient database query of the identified removed inefficient database queries, at least one data analyst designated as a submitter of the removed inefficient query;
identifying a subject matter expert associated with the at least one data analyst; and
sending a message to the subject matter expert indicating that the at least one data analyst may require additional training.

8. The method of claim 1, wherein the prioritizing the plurality of database queries based upon the set of prioritization factors further comprises prioritizing the plurality of database queries based upon each of the following:
a ranking of the at least one host submitting the each database query of the plurality of database queries; and
a system administrator input.

9. The method of claim 1, wherein the evaluating the plurality of database queries to determine the resource impact further comprises creating a relative resource impact wherein the relative resource impact is an assigned rank for the each database query of the plurality of database queries.

10. The method of claim 1, wherein the prioritizing the plurality of database queries further comprises:
determining functional characteristics of the database system associated with the plurality of database queries; and
prioritizing the database queries according to the functional characteristics of the database system.

11. A computer system for optimizing a queue of queries for database efficiency comprising:
a processor;
a memory device coupled to said processor, said processor configured to:
receive a plurality of database queries from the queue of queries from at least one host;
evaluate the plurality of database queries to determine a resource impact associated with each database query of the plurality of database queries, wherein the resource impact is determined based on a schedule impact and a human resource impact associated with the each database query of the plurality of database queries;
prioritize the plurality of database queries based upon a set of prioritization factors and the resource impact associated with the each database query of the plurality of database queries to optimize the plurality of database queries for greater efficiency, wherein the set of prioritization factors includes (i) a ranking of an analyst generating the each database query of the plurality of database queries, (ii) a data source quality, and (iii) a financial impact for receiving a response to the each database query of the plurality of database queries, wherein the data source quality represents a relative quality of data in a data source associated with the each database query, and wherein a higher priority factor is assigned to the each database query that has a corresponding response having a greatest financial impact;
submit the prioritized plurality of database queries to a database system for execution; and
execute, with the database system, the prioritized plurality of database queries in an order of priority produced by the prioritizing of the plurality of database queries.

12. A computer system in accordance with claim 11 wherein the processor is further configured to write the plurality of database queries in at least one of:
the memory device as cached queries; and
a storage device as archived queries.

13. A computer system in accordance with claim 11 further configured to:
assign a unique identifier to the each database query from the plurality of database queries;
receive a plurality of database query outputs associated with the submitted prioritized plurality of database queries; and associate each database query output of the plurality of database query outputs with at least one unique identifier.

14. A computer system in accordance with claim 11 further configured to evaluate the plurality of database queries to determine whether a first database query from the plurality of database queries is completely redundant with a second database query from the plurality of database queries.

15. A computer system in accordance with claim 11 further configured to:
identify removed inefficient database queries from the plurality of database queries;
identify, from each removed inefficient database query of the identified removed inefficient database queries, at least one data analyst designated as a submitter of the each removed inefficient query;
identify a subject matter expert associated with the at least one data analyst; and
send a message to the subject matter expert indicating that the at least one data analyst may require additional training.

16. A computer system in accordance with claim 11, further configured to create a relative resource impact wherein the relative resource impact is an assigned rank for the each database query of the plurality of database queries.

17. A computer system in accordance with claim 11, further configured to:
determine functional characteristics of the database system associated with the plurality of database queries; and
prioritize the plurality of database queries according to the functional characteristics of the database system.

18. Non-transitory computer-readable storage media for optimizing a queue of queries for database efficiency having computer-executable instructions embodied thereon, wherein, when executed by at least one processor, the computer-executable instructions cause the at least one processor to:
evaluate a plurality of database queries to determine a resource impact associated with each database query of the plurality of database queries, wherein the resource impact is determined based on a schedule impact and a human resource impact associated with the each database query of the plurality of database queries;
prioritize the plurality of database queries based upon a set of prioritization factors and the resource impact associated with the each database query of the plurality of database queries to optimize the plurality of database queries for greater efficiency, wherein the set of prioritization factors includes (i) a ranking of an analyst generating the each database query of the plurality of database queries, (ii) a data source quality, and (iii) a financial impact for receiving a response to the each database query of the plurality of database queries, wherein the data source quality represents a relative quality of data in a data source associated with the each database query, and wherein a higher priority factor is assigned to the each database query that has a corresponding response having a greatest financial impact;
submit the prioritized plurality of database queries to a database system for execution; and
execute, with the database system, the prioritized plurality of database queries in the order of priority produced by the prioritizing of the plurality of database queries.

19. The non-transitory computer-readable storage media in accordance with claim 18 wherein the computer-executable instructions further cause the processor to write the plurality of database queries in at least one of:
the memory device as cached database queries; and
a storage device as archived database queries.

20. The non-transitory computer-readable storage media in accordance with claim 18 wherein the computer-executable instructions further cause the processor to:
assign a unique identifier to the each database query from the plurality of database queries;
receive a plurality of query outputs associated with the submitted prioritized plurality of database queries; and
associate each query output of the plurality of query outputs with at least one unique identifier.

21. The non-transitory computer-readable storage media in accordance with claim 18 wherein the computer-executable instructions further cause the processor to evaluate the plurality of database queries to determine whether a first database query from the plurality of database queries is completely redundant with a second database query from the plurality of database queries.

22. The non-transitory computer-readable storage media in accordance with claim 18 wherein the computer-executable instructions further cause the processor to:
identify removed inefficient database queries from the plurality of database queries;
identify, from each removed inefficient database query of the identified removed inefficient database queries, at least one data analyst designated as a submitter of the each removed inefficient query;
identify a subject matter expert associated with the at least one data analyst; and
send a message to the subject matter expert indicating that the at least one data analyst may require additional training.

23. The non-transitory computer-readable storage media in accordance with claim 18 wherein the computer-executable instructions further cause the processor to create a relative resource impact wherein the relative resource impact is an assigned rank for the each database query of the plurality of database queries.

24. The non-transitory computer-readable storage media in accordance with claim 18 wherein the computer-executable instructions further cause the processor to:
determine functional characteristics of the database system associated with the plurality of database queries; and
prioritize the plurality of database queries according to the functional characteristics of the database system.

25. A computer-implemented method for optimizing a queue of queries for database efficiency, the method implemented by a controller computing device coupled to a memory device, the method comprising:
receiving a plurality of database queries from the queue of queries, at the controller computing device, from at least one host;
evaluating the plurality of database queries to determine a resource impact associated with each database query of the plurality of database queries;
prioritizing the plurality of database queries based upon a set of prioritization factors and the resource impact associated with the each database query of the plurality of database queries to optimize the plurality of database queries for greater efficiency, wherein the set of prioritization factors includes (i) a ranking of an analyst generating the each database query of the plurality of database queries, and (ii) a financial impact for receiving a response to the each database query of the plurality of database queries, and wherein a higher priority factor is assigned to the each database query that has a corresponding response having a greatest financial impact;

submitting the prioritized plurality of database queries to a database system for execution; and executing, with the database system, the prioritized plurality of database queries in an order of priority produced by the prioritizing of the plurality of database queries.

* * * * *